(12) United States Patent
Futami et al.

(10) Patent No.: US 6,751,385 B2
(45) Date of Patent: Jun. 15, 2004

(54) METHOD AND DEVICE FOR MEASURING THE WAVEFORM OF AN OPTICAL SIGNAL

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/012,476

(22) Filed: Dec. 12, 2001

(65) Prior Publication Data

US 2003/0002833 A1 Jan. 2, 2003

(30) Foreign Application Priority Data

Jun. 29, 2001 (JP) ...................................... 2001-199203

(51) Int. Cl.$^7$ .............................................. G02B 6/26
(52) U.S. Cl. ............................ 385/122; 385/15; 385/27
(58) Field of Search ............................. 385/15, 27, 32, 385/122

(56) References Cited

U.S. PATENT DOCUMENTS

| | | | | |
|---|---|---|---|---|
| 5,446,533 A | * | 8/1995 | Udd et al. ................. | 356/73.1 |
| 5,625,727 A | * | 4/1997 | Liedenbaum et al. ......... | 385/16 |
| 5,717,797 A | * | 2/1998 | Evans ........................ | 385/27 |
| 5,760,948 A | * | 6/1998 | Bigo ........................ | 359/326 |
| 6,222,959 B1 | * | 4/2001 | Evans ........................ | 385/27 |
| 6,393,167 B1 | * | 5/2002 | Davis et al. ................. | 385/5 |
| 6,445,848 B1 | * | 9/2002 | Islam et al. .................. | 385/24 |
| 2001/0021288 A1 | * | 9/2001 | Watanabe et al. ............ | 385/15 |
| 2002/0176152 A1 | * | 11/2002 | Parolari et al. ............. | 359/326 |

FOREIGN PATENT DOCUMENTS

| | | | | |
|---|---|---|---|---|
| EP | 635739 A1 | * | 1/1995 | G02B/6/34 |
| WO | WO 9303406 A1 | * | 2/1993 | G01B/9/02 |

OTHER PUBLICATIONS

Takara et al., "100 Gbit/s optical waveform measurement with 0.6ps resolution optical sampling using subpicosecond supercontinuum pulses", Jul. 7$^{th}$ 1994. Electronics Letters, vol. 30, No. 14.*

H. Takara, et al., "100Gbit/s Optical Signal Eye–Diagram Measurement With Optical Sampling Using Organic Non–linear Optical Crystal", Electronics Letters, Nov. 21, 1996, vol. 32, No. 24, pp. 2256–2258.

S. Diez, et al., "160–Gb/s Optical Sampling By Gain–Transparent Four–Wave Mixing in a Semiconductor Optical Amplifier", IEEE Photonics Technology Letters, vol. 11, No. 11, Nov. 1999, pp. 1402–1404.

P. A. Andrekson, "Picosecond Optical Sampling Using Four– Wave Mixing in Fibre", Electronics Letters, Aug. 1$^{st}$ 1991, vol. 27, No. 16, pp. 1440–1441.

(List continued on next page.)

*Primary Examiner*—John D. Lee

(57) ABSTRACT

A nonlinear optical loop mirror having a first optical coupler including first and second optical paths directionally coupled together, a loop optical path formed of a nonlinear optical medium for connecting the first and second optical paths, and a second optical coupler including a third optical path directionally coupled to the loop optical path. An optical signal whose waveform is to be measured is supplied into the nonlinear optical loop mirror from the first optical path. An optical trigger having a predetermined pulse width is supplied into the nonlinear optical loop mirror from the third optical path. Information on the waveform of the optical signal is obtained according to light output from the second optical path. The predetermined pulse width of the optical trigger is set according to the required measurement accuracy, so that the waveform of the optical signal can be faithfully observed with a high time resolution.

23 Claims, 9 Drawing Sheets

OTHER PUBLICATIONS

Jie Li, et al., "300 Gbit/s Eye Diagram Measurement by Optical Sampling Using Fiber Based Parametric Amplification", OFC 2001 Conference and Exhibit, Mar. 17–22, 2001 Postdeadline Papers, pp. PD31–1–PD31–3.

B. P. Nelson, et al., "Optical Sampling Oscilloscope Using Nonlinear Fibre Loop Mirror", Electronics Letters, Jan. 31$^{st}$ 1991, vol. 17, No. 3, pp. 204–205.

H.H. Kuehl, "Solitons On An Axially Nonuniform Optical Fiber", Journal of the Optical Society of America B., vol. 5, No. 3, Mar. 1988, pp. 709–713.

L. F. Mollenauer, et al., "Extreme Picosecond Pulse Narrowing by Means of Soliton Effect in Single–Mode Optical Fibers", Optics Letters, vol. 8, No. 5, May 1983, pp. 289–291.

W.J. Tomlinson, et al., "Compression of Optical Pulses Chirped by Self–Phase Modulation in Fibers", Journal of the Optical Society of America B, vol. 1, No. 2, Apr. 1984, pp. 139–149.

K. Uchiyama, et al., "Polarisation–Independent Wavelength Conversion Using Nonlinear Optical Lop Mirror", Electronics Letters, Oct. 12$^{th}$ 1995, vol. 31, No. 21, pp. 1862–1863.

* cited by examiner

METHOD AND DEVICE FOR MEASURING THE WAVEFORM OF AN OPTICAL SIGNAL

BACKGROUND OF THE INVENTION

1. Field of the Invention

The present invention relates to a method and device for measuring the waveform of an optical signal.

2. Description of the Related Art

In the field of optical fiber communication, the modulation rate of a signal continues to increase year after year. Recently, it has been seriously examined to use a signal speed of 100 Gb/s or more much higher than an electrical band by applying a time division multiplexing technique to multiplex an RZ signal of about 10 Gb/s. In researching and developing a technique related to such an ultrahigh-speed signal, a highly stable waveform measuring device having a time resolution of picoseconds to subpicoseconds is indispensable. In particular, the observation of an eye pattern as an overlaid display of signals is important from the viewpoint of application to communication.

As a device for measuring the eye pattern, a sampling oscilloscope is known. The sampling oscilloscope is a device using a signal sampling method to extract instantaneous voltage components, i.e., samples, of a periodic input signal at its sequentially different portions and to regenerate a high-frequency signal from the extracted many samples in a low-frequency region.

A time resolution in the sampling is uniquely determined by the pulse width of a trigger. At present, the band of a maximum-performance electrical sampling measurement device is limited by an electrical band, and it is about 50 GHz. Accordingly, the time resolution is about 20 ps at most.

Usually, in the case of measuring the eye pattern of an optical signal, the optical signal is once converted into an electrical signal by an opto/electrical converter, and the eye pattern of this electrical signal is next measured. Accordingly, even though an opto/electrical converter having a wide band greater than 50 GHz is used, the eye pattern of an optical signal having a width smaller than 20 ps cannot be measured.

As shown in FIG. 1, the terms of "sampling" means obtaining "AND" of an input signal and a trigger. In the case of FIG. 1, a pulse pattern generator (PPG) 4 generates a modulating signal according to a clock from an oscillator 2, and an LN (lithium niobate) optical modulator 6 modulates CW light (continuous-wave light) from a laser diode (LD) 8 according to the above modulating signal. An optical signal obtained by this modulation is transmitted by an optical fiber 10, and the transmitted optical signal is converted into electrical data by an O/E converter (opto/electrical converter) 12. Then, an electrical sampling circuit 14 measures the waveform of the input electrical data from the O/E converter 12 by using the clock from the oscillator 2 as a trigger.

As the O/E converter 12, an optical receiver having a band of about 0.60 GHz has already been put to practical use, and as the electrical sampling circuit 14, a device having a band of about 50 GHz has already been put to practical use. Accordingly, a time resolution of about 20 ps can be realized.

By obtaining the electrical "AND" as mentioned above, the eye pattern of a certain level high-speed signal can be stably measured. However, it is difficult to apply the electrical "AND" to the measurement of the eye pattern of a higher-speed signal of 100 Gb/s or more requiring a higher time resolution.

As a method for remarkably improving the time resolution, an optical sampling method is known, in which short pulse light of the order of picoseconds is used as the above-mentioned trigger, and an input optical signal and this optical trigger are input into a nonlinear medium to optically examine the cross correlation therebetween. To realize a high time resolution in the optical sampling method, ultrashort pulses of light with less phase noise are required as the optical trigger, and a nonlinear medium having ultrahigh-speed characteristics and ultrawide-band characteristics is indispensable as an AND circuit.

In the optical sampling method, the time resolution is determined by the pulse width and jitter of the optical trigger and by the response speed and group velocity dispersion of the nonlinear medium. It has been reported to use a nonlinear medium having sufficiently high-speed response characteristics and small group velocity dispersion, thereby effecting optical sampling with a time resolution of the order of picoseconds.

For example, optical sampling can be performed by using KTP having high-speed response characteristics of the order of subpicoseconds and a group delay difference of the order of subpicoseconds (interaction length: several millimeters) as the nonlinear medium and by adopting a method (SFG) of generating light corresponding to a sum frequency of an optical signal whose waveform is to be measured (which signal will be hereinafter referred to as "subject optical signal") and an optical trigger. The time resolution is limited by the pulse width of the optical trigger, and it is about 8 ps with an S/N ratio of 22 dB. Accordingly, the waveform of an optical signal of 25 Gb/s can be measured. In general, an inorganic nonlinear medium such as KTP has a problem that the conversion efficiency is low.

As an improvement in the conversion efficiency, a method of using a nonlinear organic crystal as the nonlinear medium has been reported in IEE Electronics Letters, vol. 32, issue 24, Nov. 21, 1996, pp. 2256–2258. In this method, an organic crystal (AANP) having a high conversion efficiency about 10 times or more that of an inorganic nonlinear medium is used to improve the conversion efficiency, and an optical trigger of 0.4 ps is used to achieve a time resolution of 0.9 ps.

As another method for improving the conversion efficiency, a method of utilizing four-wave mixing (FWM) generated in a semiconductor optical amplifier (SOA) is known (IEEE Photonics Technology Letters, vol. 11, no. 11, 1999, pp. 1402–1404). In this method, a time resolution of 1.7 ps has been achieved. However, there is a future problem of whether or not accurate measurement can be made on an optical signal having an arbitrary pattern, because a pattern effect due to a carrier density modulation effect is exhibited in a SOA. Other methods of utilizing FWM generated in an optical fiber have been reported (IEE Electronics Letters, vol. 27, issue 16, Aug. 1, 1991, pp. 1440–1441 and J. Li, et al., "300 Gbit/s eye-diagram measurement by optical sampling using fiber based parametric amplification", Optical Fiber Communication Conference, Mar. 17–22, 2001, Anaheim, Calif.). In the latter report, the measurement of an eye pattern corresponding to 300 Gb/s is made.

The reason why the time resolution is limited by a group velocity will now be described with reference to FIG. 2. As shown in FIG. 2, group delays $\tau_{sig}$ and $\tau_{tri}$ per unit length of an optical fiber are produced in the optical signal and the optical trigger, respectively, by the group velocity. In general, $\tau_{sig} \neq \tau_{tri}$ because the group velocity differs according to wavelength, so that a relative temporal difference (walk-off) is induced between the optical signal and the optical trigger in the optical fiber.

To efficiently generate FWM, the wavelength $\lambda_{tri}$ of the optical trigger is generally set equal to the zero-dispersion wavelength $\lambda_0$ of the optical fiber. Accordingly, when the wavelength $\lambda_{sig}$ of the optical signal is substantially equal to the zero-dispersion wavelength $\lambda_0$, the optical signal and the optical trigger cannot be separated from each other, and the waveform of the optical signal cannot therefore be observed near the zero-dispersion wavelength $\lambda_0$.

As means for basically eliminating the limitation to the time resolution by the group velocity, there has been proposed a method of using cross-phase modulation (XPM) generated in a nonlinear optical loop mirror (NOLM) (IEE Electronics Letters, vol. 27, issue 3, Jan. 31, 1991, pp. 204–205). The principle of sampling an optical signal by using a NOLM will now be described with reference to FIG. 3.

The NOLM has a first optical coupler including first and second optical paths directionally coupled to each other, a loop optical path formed of a nonlinear optical medium for connecting the first and second optical paths, and a second optical coupler including a third optical path directionally coupled to the loop optical path. The optical signal is branched into two components by the first optical coupler. One of the two components propagates clockwise in the loop optical path, and the other component propagates counterclockwise in the loop optical path. In the case that no optical trigger pulses are present, these two components are returned to the first optical coupler and interfere with each other. Then, resultant light is output from the same port (the first optical path) as the port from which the optical signal has been supplied.

When optical trigger pulses are introduced through the second optical coupler to the loop optical path and propagate with one of the two components of the optical signal in the loop optical path, this component undergoes phase modulation $\phi=2\gamma PL$ by the third-order nonlinear optical effect of an optical fiber.

In the phase modulation $\phi=2\gamma PL$, $\gamma$ is the nonlinear coefficient of the optical fiber, P is the peak power of the optical trigger pulses, and L is the length of the optical fiber (loop optical path). When the component of the optical signal undergone the phase modulation interferes with the other component of the optical signal not undergone the phase modulation, resultant light by this interference is output from the other port (the second optical path) different from the port from which the optical signal has been supplied. That is, only the sampled component of the optical signal is output from the second optical path. The sampled component is output most efficiently under the condition where $\phi=\pi$, thereby maximizing an optical signal-to-noise ratio (OSNR).

In the case of using FWM, it is preferable to strictly equalize the center wavelength $\lambda_{tri}$ of the optical trigger to the zero-dispersion wavelength $\lambda_0$ of the optical fiber, in order to achieve the phase-matching condition. In contrast, in the method using XPM, the wavelengths of the subject optical signal and the optical trigger can be set to arbitrary wavelengths. However, to substantially suppress the walk-off between the subject optical signal and the optical trigger, it is preferable to symmetrically allocate the wavelength $\lambda_{sig}$ of the optical signal and the wavelength $\lambda_{tri}$ of the optical trigger with respect to the zero-dispersion wavelength $\lambda_0$ of the optical fiber so that the group delays become equal.

In this case, however, there is a limit to the wavelength range of the subject optical signal, and a high time resolution of the order of subpicoseconds cannot be achieved. More specifically, in the case that the center wavelength $\lambda_{sig}$ of the subject optical signal is near the zero-dispersion wavelength $\lambda_0$, the sampling light and the subject optical signal cannot be separated from each other in the above-mentioned symmetrical wavelength allocation, so that the walk-off is generated to limit the time resolution. As a result, a wavelength band where the sampling waveform cannot be accurately obtained is present near the zero-dispersion wavelength $\lambda_0$.

Further, the smaller the pulse width of the optical trigger, the more remarkable the influence of the group velocity dispersion, so that pulse broadening becomes unavoidable to limit the time resolution. While a time resolution of 7 ps has been reported in the last cited literature, a high time resolution of the order of subpicoseconds is difficult to achieve by the same configuration.

Further, there is an actual problem of fluctuations of the zero-dispersion wavelength of the optical fiber along the fiber length. In general, the fluctuations are periodical and range on the order of several nanometers. As the result of the fluctuations, the graph of the group time delay shown in FIG. 2 or 3 is shifted to the right or the left. Accordingly, in the case of using a long optical fiber as the loop optical path, the group time delay is locally shifted to cause a degradation in the time resolution.

SUMMARY OF THE INVENTION

It is therefore an object of the present invention to provide a method and device for measuring the waveform of an optical signal which can faithfully observe the waveform of the optical signal with a high time resolution.

In accordance with an aspect of the present invention, there is provided a method of measuring the waveform of an optical signal. In this method, a nonlinear optical loop mirror is provided, which comprises a first optical coupler including first and second optical paths directionally coupled to each other, a loop optical path formed of a nonlinear optical medium for connecting said first and second optical paths, and a second optical coupler including a third optical path directionally coupled to said loop optical path. An optical signal whose waveform is to be measured is supplied into said nonlinear optical loop mirror from said first optical path. An optical trigger having a predetermined pulse width is supplied into said nonlinear optical loop mirror from said third optical path. Information on the waveform of said optical signal is obtained according to light output from said second optical path. The predetermined pulse width is set according to a required measurement accuracy.

According to this method, the pulse width of the optical trigger is set according to the required measurement accuracy, so that the waveform of the subject optical signal can be faithfully observed with a high time resolution.

In accordance with another aspect of the present invention, there is provided a device for measuring the waveform of an optical signal. This device comprises a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path; means for supplying said optical signal whose waveform is to be measured into said nonlinear optical loop mirror from said first optical path; means for supplying an optical trigger having a predetermined pulse width into said nonlinear optical loop mirror from said third optical path; means for obtaining information on the waveform of said optical signal according to light output from said second optical path; and means for setting said predetermined pulse width according to a required measurement accuracy.

In accordance with a further aspect of the present invention, there is provided a system comprising an optical fiber transmission line for transmitting an optical signal; and a waveform measuring device for receiving said optical signal transmitted by said optical fiber transmission line. The device according to the present invention may be used as said waveform measuring device.

In accordance with a still further aspect of the present invention, there is provided a system an optical fiber transmission line for transmitting an optical signal; a device provided along said optical fiber transmission line for processing said optical signal; and a waveform measuring device provided immediately downstream of said device for processing said optical signal. The device according to the present invention may be used as said waveform measuring device.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
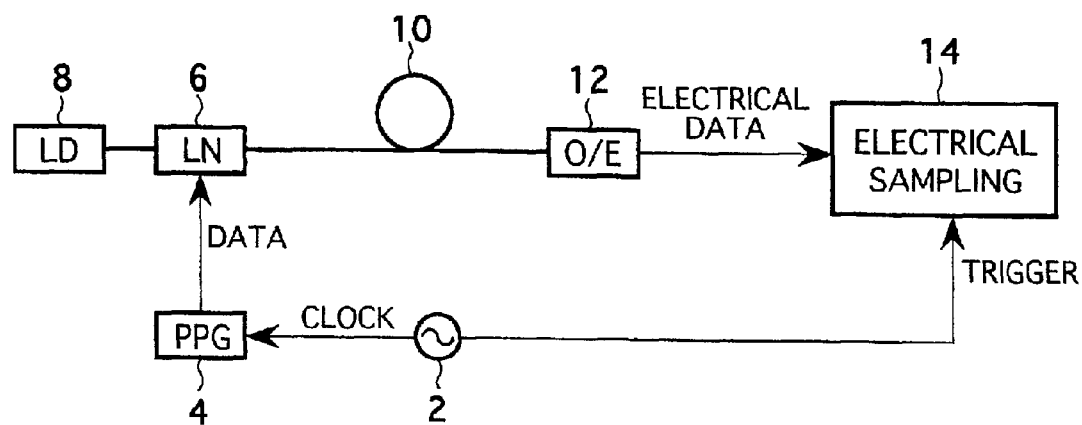
FIG. 1 is a block diagram for illustrating an eye pattern measuring method using a conventional electrical sampling waveform measuring device.
Figure 2:
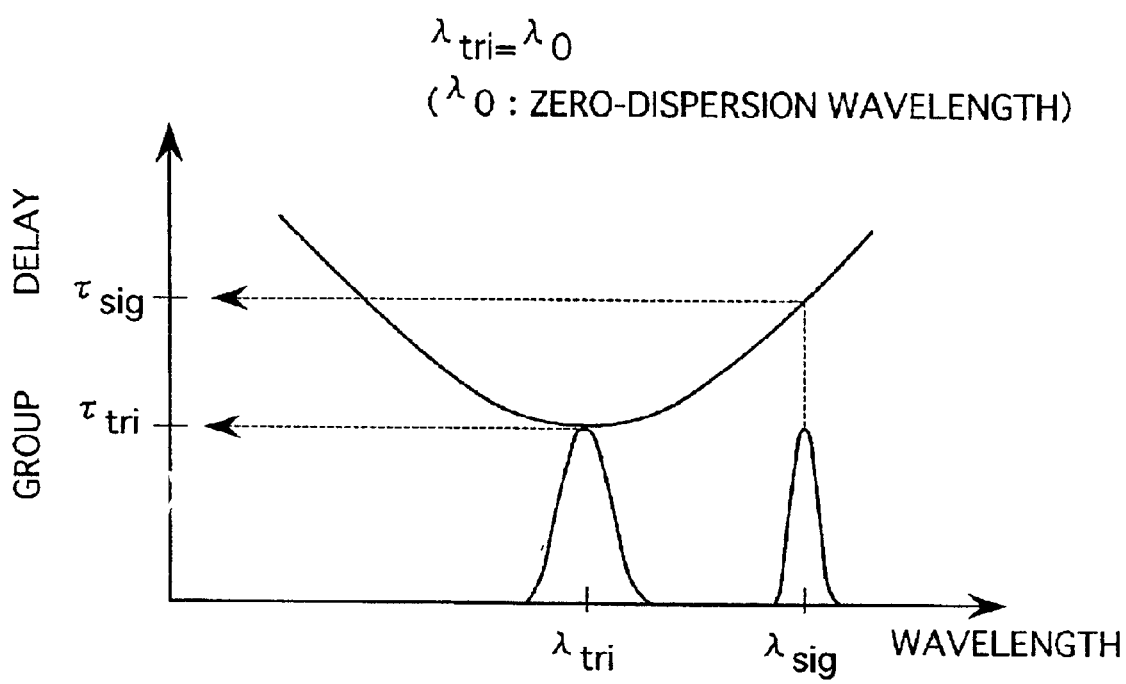
FIG. 2 is a graph for illustrating the allocation of the wavelengths of a subject optical signal and an optical trigger in the case of optical sampling waveform measurement using four-wave mixing.

Some preferred embodiments of the present invention will now be described in detail.

In order to achieve a time resolution of subpicoseconds, the use of an optical trigger having a pulse width of subpicoseconds is necessary. In general, it is difficult to generate such an ultrashort pulse directly by laser. In the present invention, a pulse having a width on the order of picoseconds that can be usually easily generated is compressed to generate such an ultrashort pulse. The pulse compression is physically performed by the following two methods.

The first method is a method utilizing a soliton, and this method is classified into a soliton adiabatic compression method and higher-order soliton compression. The soliton adiabatic compression method utilizes the fact that when self-phase modulation (SPM) induced by the third-order nonlinear effect of an optical fiber is produced in an anomalous dispersion region, the dispersion and the nonlinear effect are balanced to generate an eigen solution, i.e., a fundamental soliton. The higher-order soliton compression utilizes the fact that a higher-order optical soliton having a power higher than that under a fundamental soliton condition periodically changes with a so-called soliton length as one period.

The soliton adiabatic compression method requires a special optical fiber (dispersion decreasing fiber) designed so that the absolute value of a group velocity dispersion decreases from an input end of the fiber in its longitudinal direction, and the principle thereof has been reported in OSA, J. Opt. Soc. Am. B, vol. 1, no. 2, pp. 139–149, 1984, for example. The principle of the higher-order soliton compression is described in OSA, Opt. Lett., vol. 8, no. 5, pp. 289–291, 1983, for example.

The second method is a method utilizing the fact that SPM substantially linearly induces frequency chirp in a normal dispersion region of an optical fiber. In this method, a spectrum is broadened by chirp accumulation, and the subsequently induced frequency chirp is compensated to perform pulse compression. The principle thereof is described in OSA, J. Opt. Soc. Am. B, vol. 1, no. 2, pp. 139–149, 1984.

The subpicosecond ultrashort pulse thus produced is likely to broaden its pulse width by the influence of group velocity dispersion. The pulse broadening of an optical trigger due to the group velocity dispersion is proportional to the product of a group velocity dispersion at the wavelength of the optical trigger and an optical fiber length. Further, the group velocity dispersion is proportional to a detuning wavelength from the zero-dispersion wavelength of an optical fiber. Accordingly, by reducing the optical fiber length as far as possible, the pulse broadening can be avoided and the measurement of the waveform of a subject optical signal can be made.

By reducing the optical fiber length, variations in group time delay due to fluctuations in zero-dispersion wavelength along the fiber can also be simultaneously reduced. Conversely, the interaction length between the subject optical signal and the optical trigger is reduced, and it is difficult to generate phase modulation enough to establish a cross correlation. Accordingly, it is only possible to obtain a sampling waveform not reflecting an actual condition which is deteriorated in OSNR than an actual subject optical signal.

As previously mentioned, the phase modulation ø given to a subject optical signal by an optical trigger is expressed as ø=2γPL. The condition of ø=π for optimum sampling can be realized by increasing the nonlinear coefficient γ of an optical fiber or the peak power P of an optical trigger, in the case that the interaction length L is short. To increase the nonlinear coefficient γ, a highly nonlinear optical fiber having a high nonlinearity of optical fiber is effective. There has been reported an HNL-DSF having a high nonlinearity about 8 times the nonlinearity of a general dispersion shifted fiber (DSF) (S. Watanabe, et al., "Simultaneous wavelength conversion and optical phase conjugation of 200 Gb/s (5×40 Gb/s) WDM signal using a highly nonlinear fiber four-wave mixer", 11th Integrated Optics and Optical Fiber Communications (IOOC)/23rd European Conference on Optical Communications (ECOC '97), Post-deadline paper, TH3A, pp. 1–4, Edinburgh, 1997).

Increasing the peak power of the optical trigger under the condition where the saturation output of an optical amplifier is limited can be effected by lowering a repetition frequency. For example, by frequency dividing a clock extracted from the subject optical signal into 1/n (n is an integer greater than 1) to generate the optical trigger from the resultant clock, the peak power of the optical trigger can be increased n times that in the case of no frequency division.

In general, the intensity transfer function of a NOLM is not linear with respect to the intensity of input light, but has, a $\cos^2$ characteristic. Accordingly, it is desirable to calibrate this characteristic.

In the NOLM, a first optical coupler is required to divide the subject optical signal into two components and make the two components interfere with each other, and a second optical coupler is required to add the optical trigger to one of the two components. However, each of these optical couplers need not be a special optical coupler whose coupling ratio changes according to wavelength.

Figure 4:
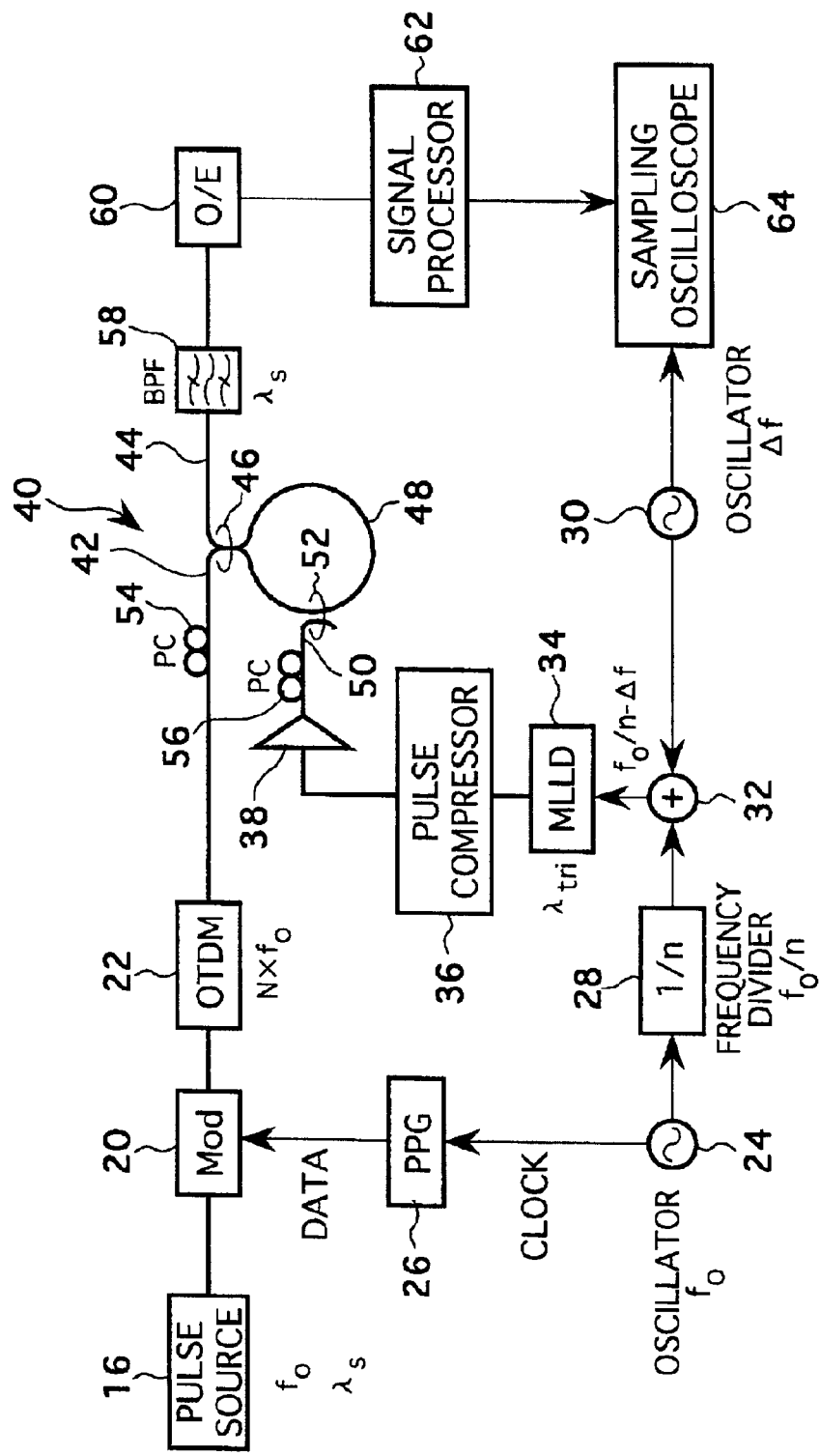
FIG. 4 is a block diagram showing a first preferred embodiment of the device according to the present invention.

Referring to FIG. 4, there is shown a first preferred embodiment of the device according to the present invention. A pulse source 16 generates RZ pulses having a repetition frequency $f_0$ (Hz) and a wavelength $\lambda_s$. The RZ pulses are encoded by data having a transmission rate $f_0$ (b/s) by a modulator (Mod.) 20, and the transmission rate of the RZ pulses thus encoded is multiplied by N (N is an integer greater than 1) by an optical time division multiplexer (OTDM) 22. Thus, an ultrahigh-speed subject optical signal having a transmission rate N×$f_0$ (b/s) is generated. The data to be supplied to the modulator 20 is obtained by converting a clock having a frequency $f_0$ (Hz) from an oscillator 24 by means of a pulse pattern generator (PPG) 26.

The clock output from the oscillator 24 is utilized for the generation of an optical trigger. To increase the peak power of the optical trigger, the clock having the frequency $f_0$ (Hz) output from the oscillator 24 is frequency divided into an electrical clock having a frequency $f_0/n$ (Hz) (n is an integer greater than 1) by a frequency divider 28.

To sequentially sample time domains having different signal waveforms, an oscillator 30 for outputting a sweep signal having a frequency Δf (Hz) is used. The signal from the frequency divider 28 and the sweep signal from the oscillator 30 are supplied to a frequency shifter 32 to generate an RF clock having a frequency $f_0/n-\Delta f$ (Hz). A mode-locked laser (MLLD) 34 is driven by this RF clock to obtain optical clock pulses having a wavelength $\lambda_{tri}$ and a repetition frequency $f_0/n-\Delta f$ (Hz).

For sampling measurement with a subpicosecond high time resolution, the optical clock pulses output from the mode-locked laser 34 are compressed to subpicosecond pulses by a pulse compressor 36 to obtain an optical trigger allowing the time widths between sampling points to be narrowed.

A NOLM 40 includes an optical coupler 46 including optical paths 42 and 44 directionally coupled to each other, a loop optical path 48 for connecting the optical paths 42 and 44, and an optical coupler 52 including an optical path 50 directionally coupled to the loop optical path 48. The loop optical path 48 is formed of a nonlinear optical medium (e.g., HNL-DSF).

The subject optical signal from the multiplexer 22 is controlled in its polarization state by a polarization controller (PC) 54, and thereafter supplied into the NOLM 40 from the optical path 42. On the other hand, the optical trigger from the pulse compressor 36 is amplified by an optical amplifier 38, next controlled in its polarization state by a polarization controller 56 so that the polarization state of the optical trigger coincides with the polarization state of the subject optical signal, next supplied into the NOLM 40 from the optical path 50.

A component of the subject optical signal propagating counterclockwise in the loop optical path 48 undergoes phase modulation only when propagating with the optical trigger. This counterclockwise component of the subject optical signal is returned to the optical coupler 46, and interferes with the other component of the subject optical signal propagating clockwise in the loop optical path 48 at the optical coupler 46. In this interference, the component not undergone phase modulation by the optical trigger is output from the port 42, and the component undergone phase modulation by the optical trigger is output from the port 44.

Thus, the component of the subject optical signal sampled by the optical trigger and passed through the NOLM 40 is extracted by an optical bandpass filter (BPF) 58 having a transmission center wavelength $\lambda_s$. A component passed through the optical bandpass filter 58 is converted into an electrical signal by an opto/electrical converter (O/E converter) 60, and next supplied to a signal processor 62.

The signal processor 62 configures a waveform change by the intensity transfer function of the NOLM 40, and displays the configured result by means of a sampling oscilloscope 64.

The sampling oscilloscope 64 is supplied with the sweep signal from the oscillator 30 to display the waveform of the subject optical signal as an eye pattern. The signal processor 62 further calculates the Q factor and OSNR of the subject optical signal.

By using a highly nonlinear fiber as a nonlinear medium, a required fiber length can be reduced. For example, by using an HNL-DSF having a high nonlinearity about 8 times that of a general dispersion shifted fiber (DSF), the required fiber length can be reduced to ⅛. As a result, pulse broadening due to group velocity dispersion can be suppressed to thereby allow a high resolution. For example, an optical trigger having a pulse width of 0.3 ps (bandwidth of about 10 nm) merely shows a pulse broadening of less than 15 fs in an HNL-DSF having a length of 50 m.

The peak power of the optical trigger required for most efficient sampling in the case of 50 m for a fiber length is about 1.5 W, which can be easily obtained.

Further, in the case that the fiber length can be reduced to about 50 m, dispersion fluctuations along the fiber can be almost neglected.

Figure 3:
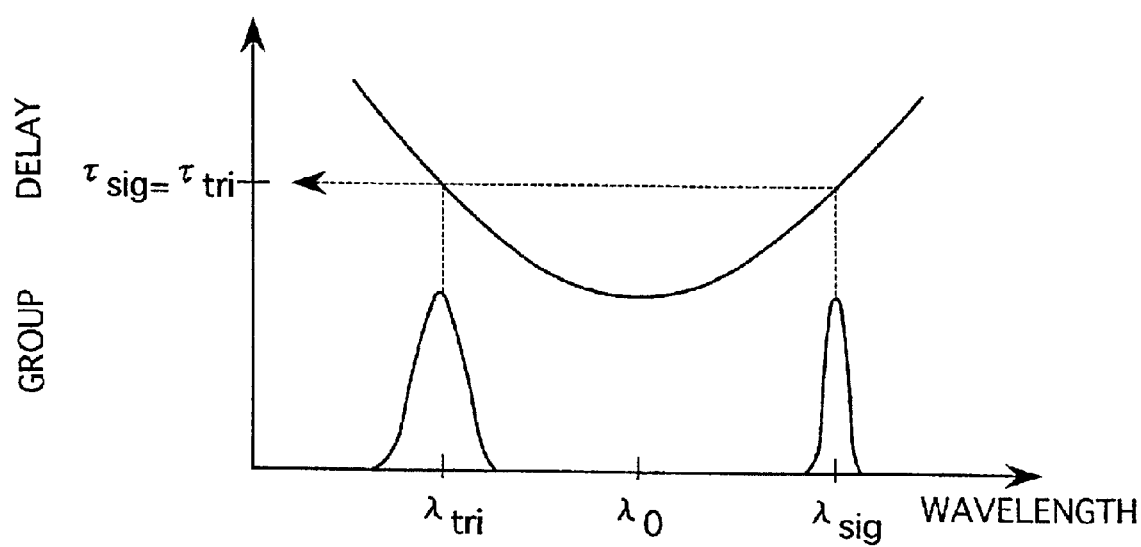
FIG. 3 is a graph for illustrating such wavelength allocation in the case of optical sampling waveform measurement using an XPM effect induced by an optical trigger in an optical fiber.

Further, in the case of 50 m for a fiber length, a group time delay difference between the optical trigger and the subject optical signal is as very small as about 0.3 ps even at the worst (in the case that the detuning wavelength is 30 nm). Accordingly, it is not necessary to set the wavelengths of the optical trigger and the subject optical signal so that the detuning wavelengths of them from the zero-dispersion wavelength are equal to each other as described previously with reference to FIG. 3. As a result, a device for sampling can be greatly easily constructed.

Figure 5:
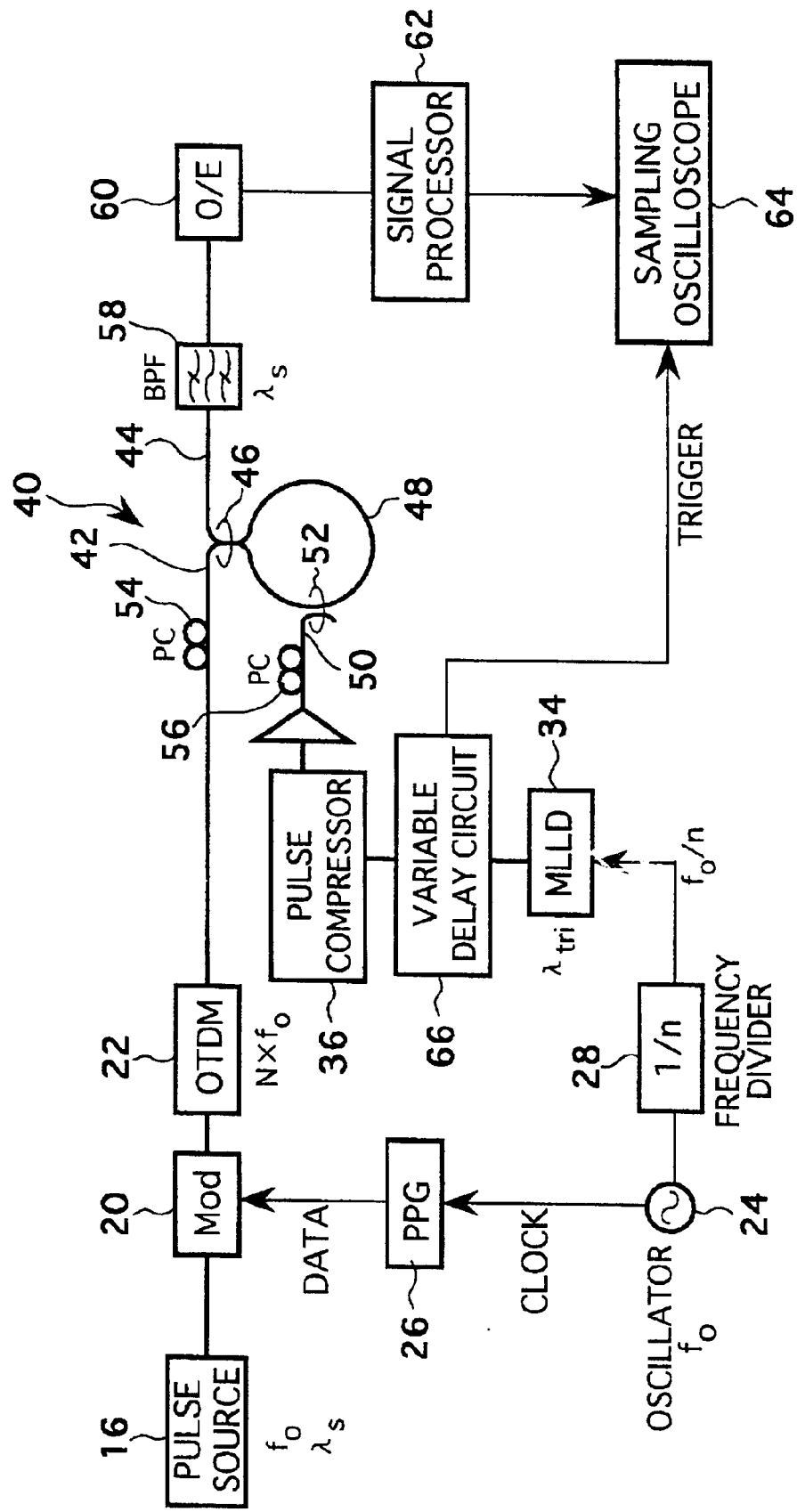
FIG. 5 is a block diagram showing a second preferred embodiment of the device according to the present invention.

Referring to FIG. 5, there is shown a second preferred embodiment of the device according to the present invention. This preferred embodiment is different from the preferred embodiment shown in FIG. 4 in the sweeping method for the optical trigger. In this preferred embodiment, a variable delay circuit 66 as a spatial delay optical circuit is provided between the mode-locked laser 34 and the pulse compressor 36 to physically periodically change the optical path length of the optical trigger, thereby sequentially sweeping the sampling points in the waveform of the subject optical signal. By supplying a trigger signal synchronous with this period from the variable delay circuit 66 to the sampling oscilloscope 64, the sweeping in the sampling oscilloscope 64 is allowed. According to this preferred embodiment, the oscillator 30 shown in FIG. 4 can be eliminated.

Figure 6:
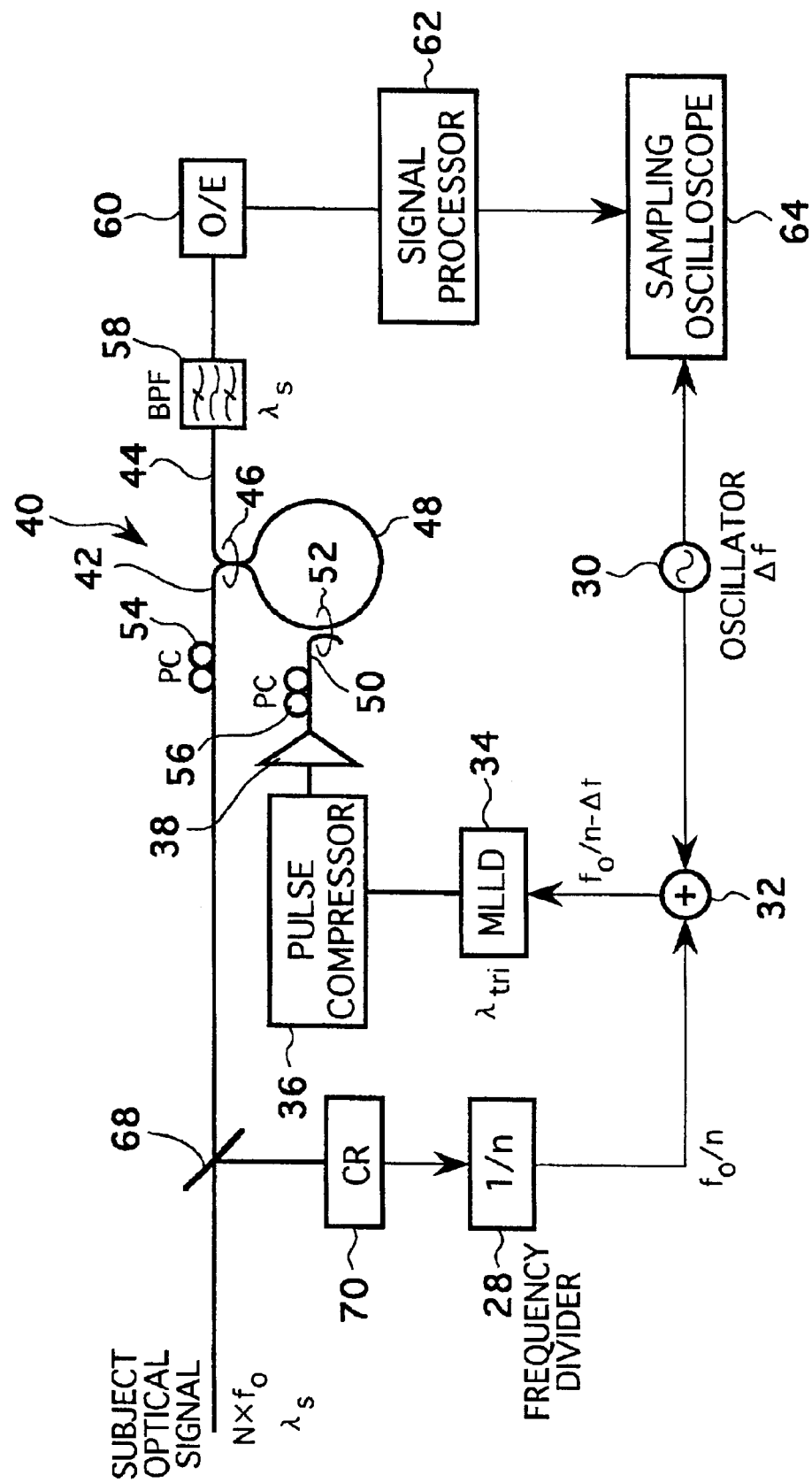
FIG. 6 is a block diagram showing a third preferred embodiment of the device according to the present invention.

Referring to FIG. 6, there is shown a third preferred embodiment of the device according to the present invention. In the case of monitoring the quality of an optical signal at a receiving end of an optical fiber communication system, there is a possibility that unless the sampling is carried out by using a clock synchronized in phase with the optical signal, the waveform of the optical signal cannot be accurately observed, because the optical signal transmitted over a long distance has temporal fluctuations.

In this respect, the third preferred embodiment is characterized in that a clock is extracted according to a transmitted optical signal as the subject optical signal.

The transmitted optical signal is branched into first and second optical signals by an optical coupler 68. The first optical signal is supplied through the polarization controller 54 to the NOLM 40 for the purpose of measurement of a sampling waveform. The second optical signal is supplied to a clock recovery (CR) circuit 70, and a resultant clock is supplied to the frequency divider 28.

In the clock recovery circuit 70, the clock is extracted by a method of electrically extracting a fundamental frequency component ($f_0$) remaining because of incompleteness in time division multiplexing or a method of extracting using an optical demultiplexing method.

The principle of measurement of the sampling waveform of a time division multiplexed optical signal is the same as that in the preferred embodiment shown in FIG. 4, so the description thereof will be omitted herein.

Figure 7:
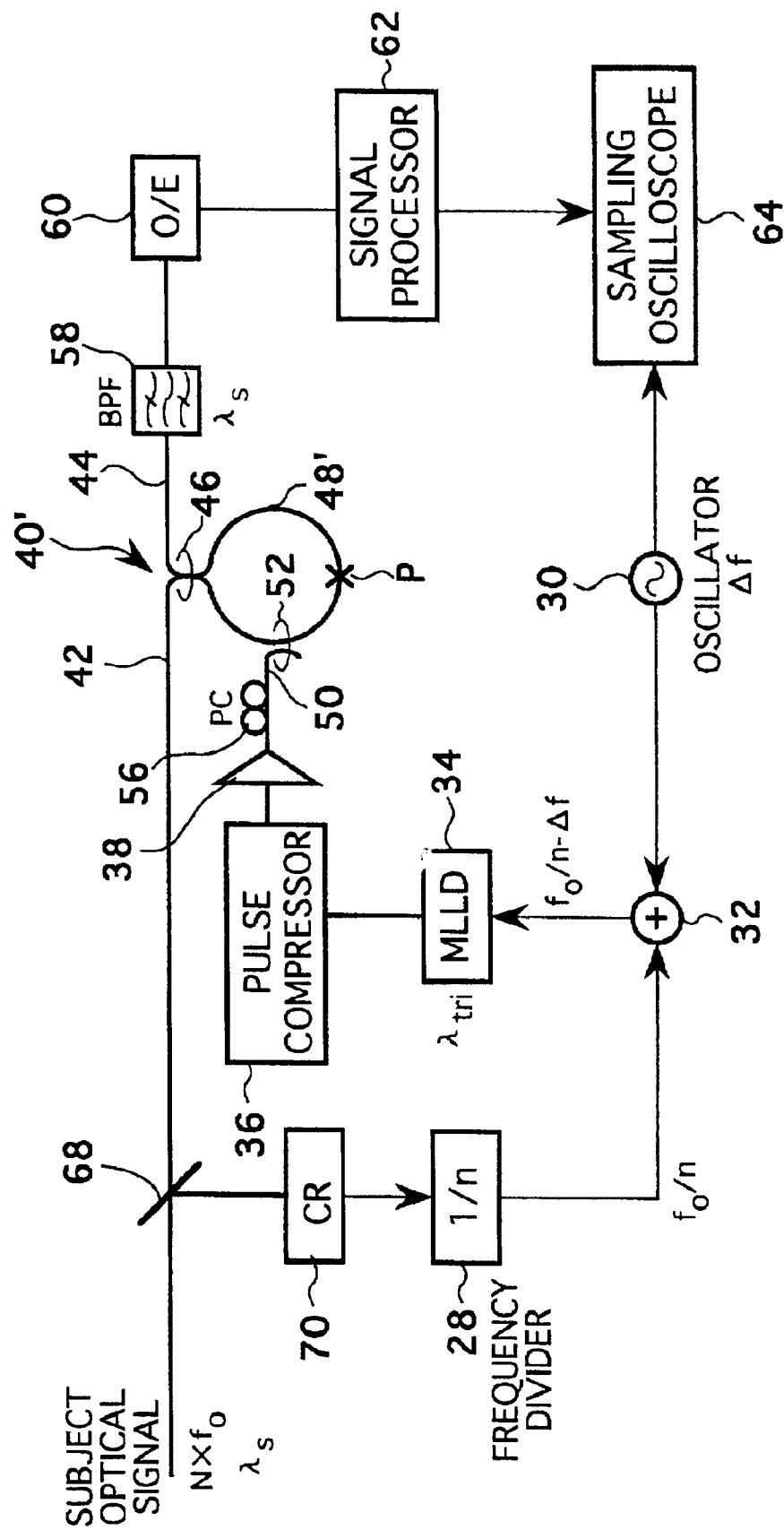
FIG. 7 is a block diagram showing a fourth preferred embodiment of the device according to the present invention.

Referring to FIG. 7, there is shown a fourth preferred embodiment of the device according to the present invention. In general, the polarization state of an optical signal transmitted by a transmission line is not constant because of variations of the transmission line due to environmental changes or the like. In measuring the sampling waveform of the optical signal, it is preferable to eliminate polarization dependence. In this respect, this preferred embodiment is characterized by the use of a NOLM 40' having a loop optical path 48' specially designed. The other configuration is the same as that of the preferred embodiment shown in FIG. 6, and as the result the polarization controller 54 shown in FIG. 6 can be eliminated.

For example, the loop optical path 48' has such a design that a polarization maintaining, highly nonlinear dispersion shifted fiber (PM-HNL-DSF) is twisted 90° at its midpoint and spliced at the opposite ends. The polarization state of the optical trigger supplied through the optical coupler 52 to the loop optical path 48' is set to a linear polarization state shifted 45° with respect to the fast axis of the PM-HNL-DSF.

By this setting, the optical trigger can be made to equivalently exist on both the fast axis and the slow axis orthogonal to each other, thereby giving phase modulation to the subject optical signal having an arbitrary polarization state. As a result, polarization independent sampling is allowed.

Figure 8:
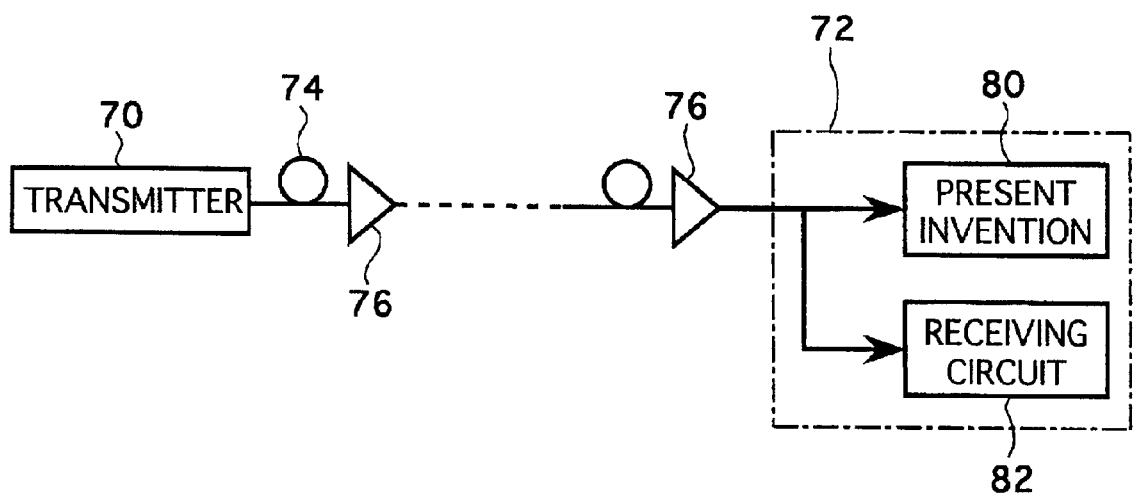
FIG. 8 is a block diagram showing a fifth preferred embodiment of the device (system) according to the present invention.

Referring to FIG. 8, there is shown a fifth preferred embodiment of the device (system) according to the present invention. An optical fiber transmission line 74 is connected between an optical transmitter 70 and an optical receiver 72. A plurality of optical amplifiers 76 are arranged along the optical fiber transmission line 74. Alternatively, a single optical amplifier 76 may be provided.

The optical receiver 72 includes a device 80 according to the present invention and a receiving circuit 82 both receiving an optical signal transmitted by the optical fiber transmission line 74.

In the case of long-haul transmission using the optical amplifiers 76, the optical signal transmitted by the optical fiber transmission line 74 has temporal fluctuations in many cases as described above. Accordingly, the preferred embodiments shown in FIGS. 6 and 7 are suitable for the system shown in FIG. 8 in obtaining a clock synchronized in phase with the transmitted optical signal.

Figure 9:
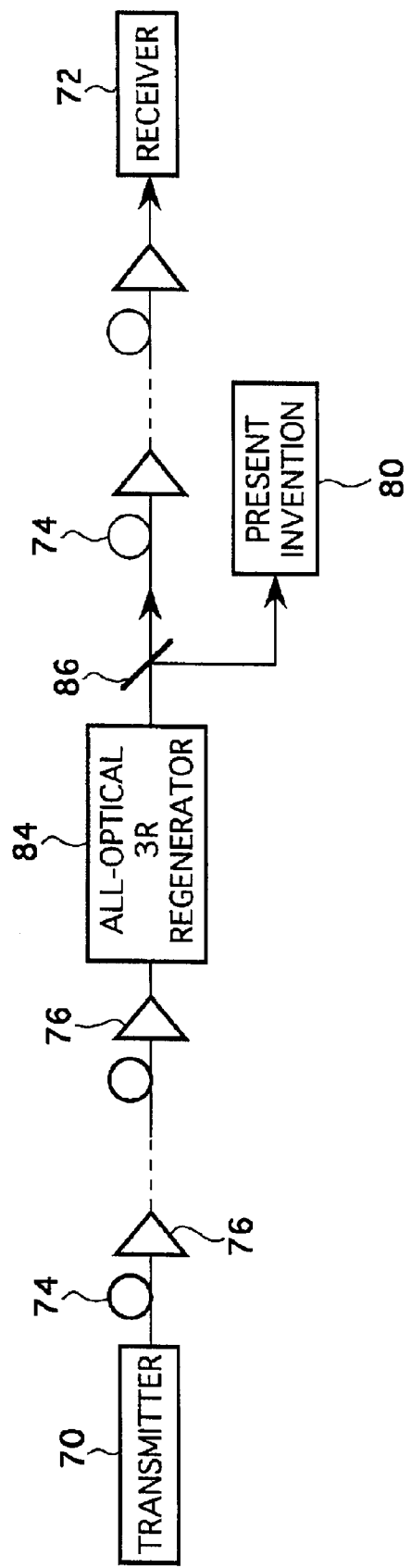
FIG. 9 is a block diagram showing a sixth preferred embodiment of the device (system) according to the present invention.

Referring to FIG. 9, there is shown a sixth preferred embodiment of the device (system) according to the present invention. In this preferred embodiment, an all-optical 3R regenerator 84 as a signal processing device is inserted in the optical fiber transmission line 74, and the present invention is applied for monitoring immediately downstream of the regenerator 84. That is, an optical coupler 86 is inserted in the optical fiber transmission line 74 at a position immediately downstream of the regenerator 84, and an optical signal branched by the optical coupler 86 is supplied as the subject optical signal to the device 80 according to the present invention.

According to the present invention, the Q factor and OSNR of an ultrahigh-speed optical signal of 100 Gb/s or more can be easily measured. Accordingly, the quality of the optical signal output from the all-optical 3R regenerator 84 can be monitored always on time.

In the prior art, such high-speed signal monitoring requires that an optical signal is once subjected to time division multiplexing to obtain a low-speed signal that can be electrically processed for electrical measurement. To the contrary, according to the present invention, opto/electrical conversion and electro/optical conversion are not required, so that an optical signal can be monitored very simply.

According to the present invention as described above, it is possible to provide a method and device for measuring the waveform of an optical signal which can faithfully observe the waveform of the optical signal with a high time resolution.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of measuring the waveform of an optical signal, comprising:
   providing a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

supplying said optical signal whose waveform is to be measured into said nonlinear optical loop mirror from said first optical path;

supplying an optical trigger having a predetermined pulse width into said nonlinear optical loop mirror from said third optical path:

obtaining information on the waveform of said optical signal according to light output from said second optical path; and setting said predetermined pulse width according to a required measurement accuracy, wherein the predetermined pulse width of the optical trigger is shorter than the pulse width of the optical signal whose waveform is to be measured, and wherein the predetermined pulse width includes a time resolution of subpicoseconds.

2. A method according to claim 1, wherein said setting comprises obtaining said optical trigger by pulse compression.

3. A method according to claim 2, wherein said pulse compression comprises a soliton adiabatic method.

4. A method according to claim 2, wherein said pulse compression comprises higher-order soliton compression.

5. A method according to claim 2, wherein said pulse compression comprises a method of inducing frequency chirp in a normal dispersion region of an optical fiber.

6. A method according to claim 1, wherein said optical trigger comprises an optical clock periodically repeating on and off states.

7. A method according to claim 6, further comprising obtaining said optical clock according to a clock component of said optical signal.

8. A method of measuring the waveform of an optical signal, comprising:

providing a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

supplying said optical signal whose waveform is to be measured into said nonlinear optical loop mirror from said first optical path;

supplying an optical trigger having a predetermined pulse width into said nonlinear optical loop mirror from said third optical path;

obtaining information on the waveform of said optical signal according to light output from said second optical path;

setting said predetermined pulse width according to a required measurement accuracy, wherein said optical trigger comprises an optical clock periodically repeating on and off states; and obtaining said optical clock according to a clock component of said optical signal, wherein said obtaining said optical clock comprises frequency dividing said clock component of said optical signal.

9. A device for measuring the waveform of an optical signal, comprising:

a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

means for supplying said optical signal whose waveform is to be measured into said nonlinear optical loop mirror from said first optical path;

means for supplying an optical trigger having a predetermined pulse width into said nonlinear optical loop mirror from said third optical path;

means for obtaining information on the waveform of said optical signal according to light output from said second optical path; and means for setting said predetermined pulse width according to a required measurement accuracy, wherein the predetermined pulse width of the optical trigger is shorter than the pulse width of the optical signal whose waveform is to be measured, and wherein the predetermined pulse width includes a time resolution of subpicoseconds.

10. A device according to claim 9, wherein said setting means comprises a pulse compressor.

11. A device according to claim 10, wherein said pulse compressor sets said pulse width by a soliton adiabatic method.

12. A device according to claim 10, wherein said pulse compressor sets said pulse width by higher-order soliton compression.

13. A device according to claim 10, wherein said pulse compressor sets said pulse width by inducing frequency chirp in a normal dispersion region of an optical signal.

14. A device according to claim 9, wherein said optical trigger comprises an optical clock periodically repeating on and off states.

15. A device according to claim 14, further comprising means for obtaining said optical clock according to a clock component of said optical clock.

16. A device for measuring the waveform of an optical signal, comprising:

a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

means for supplying said optical signal whose waveform is to be measured into said nonlinear optical loop mirror from said first optical path;

means for supplying an optical trigger having a predetermined pulse width into said nonlinear optical loop mirror from said third optical path;

means for obtaining information on the waveform of said optical signal according to light output from said second optical path;

means for setting said predetermined pulse width according to a required measurement accuracy, wherein said optical trigger comprises an optical clock periodically repeating on and off states; and means for obtaining said optical clock according to a clock component of said optical signal, wherein said means for obtaining said optical clock comprises means for frequency dividing said clock component of said optical signal.

17. A system comprising:

an optical fiber transmission line for transmitting an optical signal; and a waveform measuring device for receiving said optical signal transmitted by said optical fiber transmission line; said waveform measuring device comprising:

a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

means for supplying said optical signal whose waveform is to be measured into said nonlinear optical loop mirror from said first optical path;

means for supplying an optical trigger having a predetermined pulse width into said nonlinear optical loop mirror from said third optical path;

means for obtaining information on the waveform of said optical signal according to light output from said second optical path; and means for setting said predetermined pulse width according to a required measurement accuracy, wherein the predetermined pulse width of the optical trigger is shorter than the pulse width of the optical signal whose waveform is to be measured, and wherein the predetermined pulse width includes a time resolution of subpicoseconds.

18. A system according to claim 17, further comprising an optical amplifier arranged along said optical fiber transmission line for amplifying said optical signal.

19. A system according to claim 17, further comprising a plurality of optical amplifiers arranged along said optical fiber transmission line each for amplifying said optical signal.

20. A system comprising:

an optical fiber transmission line for transmitting an optical signal;

a device provided along said optical fiber transmission line for processing said optical signal; and a waveform measuring device provided immediately downstream of said device for processing said optical signal; said waveform measuring device comprising:

a nonlinear optical loop mirror comprising a first optical coupler including first and second optical paths directionally coupled to each other, a loop optical path formed of a nonlinear optical medium for connecting said first and second optical paths, and a second optical coupler including a third optical path directionally coupled to said loop optical path;

means for supplying said optical signal whose waveform is to be measured into said nonlinear optical loop mirror from said first optical path;

means for supplying an optical trigger having a predetermined pulse width into said nonlinear optical loop mirror from said third optical path;

means for obtaining information on the waveform of said optical signal according to light output from said second optical path; and means for setting said predetermined pulse width according to a required measurement accuracy, wherein the predetermined pulse width of the optical trigger is shorter than the pulse width of the optical signal whose waveform is to be measured, and wherein the predetermined pulse width includes a time resolution of subpicoseconds.

21. A system according to claim 20, wherein said device for processing said optical signal comprises an optical repeater.

22. A system according to claim 20, further comprising an optical amplifier arranged along said optical fiber transmission line for amplifying said optical signal.

23. A system according to claim 20, further comprising a plurality of optical amplifiers arranged along said optical fiber transmission line each for amplifying said optical signal.

* * * * *